No. 816,984. PATENTED APR. 3, 1906.
T. A. KILLMAN.
AUTOMATIC WEIGHING AND COMPUTING SCALE.
APPLICATION FILED JAN. 27, 1905.

UNITED STATES PATENT OFFICE.

THOMAS A. KILLMAN, OF LIBERTY, TENNESSEE.

AUTOMATIC WEIGHING AND COMPUTING SCALE.

No. 816,984.        Specification of Letters Patent.        Patented April 3, 1906.

Application filed January 27, 1905. Serial No. 242,910.

*To all whom it may concern:*

Be it known that I, THOMAS A. KILLMAN, a citizen of the United States, residing at Liberty, in the county of Dekalb and State of Tennessee, have invented a new and useful Automatic Weighing and Computing Scale, of which the following is a specification.

The invention relates to improvements in automatic scales.

The object of the present invention is to improve the construction of automatic scales and to provide a simple and comparatively inexpensive one designed for weighing granular and pulverulent material—such as coffee, sugar, rice, and the like—and adapted to automatically shut off the flow of the material when it has received the desired quantity of the material being weighed.

A further object of the invention is to provide a scale of this character adapted to deliver in a large stream the bulk of the charge to enable the goods to be rapidly weighed and capable of automatically reducing the size of the stream as the last half-pound or other predetermined quantity is delivered to the scale, so that the operation of weighing will be effected with great accuracy.

Another object of the invention is to provide a scale which will permit the material to be discharged in a small stream only when a small quantity, such as a half-pound or less, is to be weighed, thereby insuring accuracy in all the weighing operations of the scale.

The invention also has for its object to provide cut-off mechanism adapted to reduce the size of the stream without changing the form of the discharge-opening and to enable the flow to be cut off without liability of any of the grains interfering with the closing operation.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings.

Like numerals of reference designate corresponding parts in all the figures of the drawings.

Figure 12:
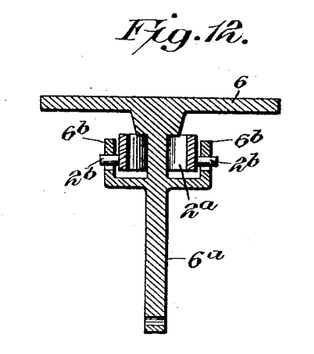
Fig. 12 is a detail vertical sectional view on the line 12 12 of Fig. 11.
Figure 13:
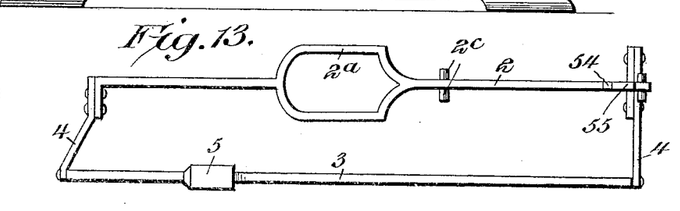
Fig. 13 is a plan view of the lower beam.

1 designates a weighing and computing scale provided with a lower weighing-beam 2, having a front graduated bar 3, connected at its ends to the lower beam 2 by arms 4 or other suitable means. The graduated bar has a sliding poise 5 and is designed to be provided with a suitable chart having calculations for indicating the price of the goods weighed. The sliding poise is designed to be provided with price-per-pound numerals arranged to correspond with the characters on the front bar 3, and when the weighing operation is completed, as hereinafter described, the scale will indicate both the weight and the price of the goods. The lower beam 2 is provided with knife-edged pivots $2^c$, arranged in bearing-openings of a post $8^a$, which rises from a base 9 and on which the lower beam 2 is fulcrumed. The scale is provided with a scale-pan on which is arranged a receptacle 7 for the goods to be weighed. The lower beam is provided with an open portion $2^a$, through which extends a stem or bar 6ᵃ of the scale-pan 6, and the said stem or bar is provided at opposite sides with substantially L-shaped arms 6ᵇ, having bearing-openings to receive knife-edged pivots 2ᵇ of the lower beam 2, as clearly illustrated in Fig. 12 of the drawings. The lower end of the stem or bar of the scale-pan is connected with the platform-levers (not shown) when a platform 8 is employed. The platform 8 is arranged on the base 9 of the frame, which also supports the hopper or bin 11. The lower weighing-beam 2 is connected, by means hereinafter described, with an upper beam 12, which constitutes the means for operating or tripping the supply-gates or cut-offs for controlling the flow of the material from the hopper or bin 11. The connections between the weighing-beam, scale-pan, and the platform and the manner of mounting such parts do not constitute any portion of the present invention, and these portions of the scale may be constructed in any desired manner. Any further description and illustration thereof is deemed unnecessary. The greater portion of the weight of both the upper and lower beams is above the pivotal point or center of support, so that the said upper and lower beams when in a horizontal position will be in unstable equilibrium. These beams when brought to a poising-point or to a horizontal position will not remain in such position, as the slightest movement of the beams will carry them to one side or the other of the pivotal point, and this action is employed, as hereinafter fully explained, for operating the mechanism for controlling the flow of material. The upper beam 12 is fulcrumed between its ends on suitable knife-edge pivots 13, which are arranged in suitable bearings of a hanger 14. The hanger 14, which depends from the top of the frame 10, is provided with vertical spaced side portions, between which is arranged the upper beam 12.

The frame 10 consists of horizontal top and bottom portions and the connecting vertical portion arranged at the back of the frame, the latter being braced by upper and lower brackets 15 and 16.

Figure 1:
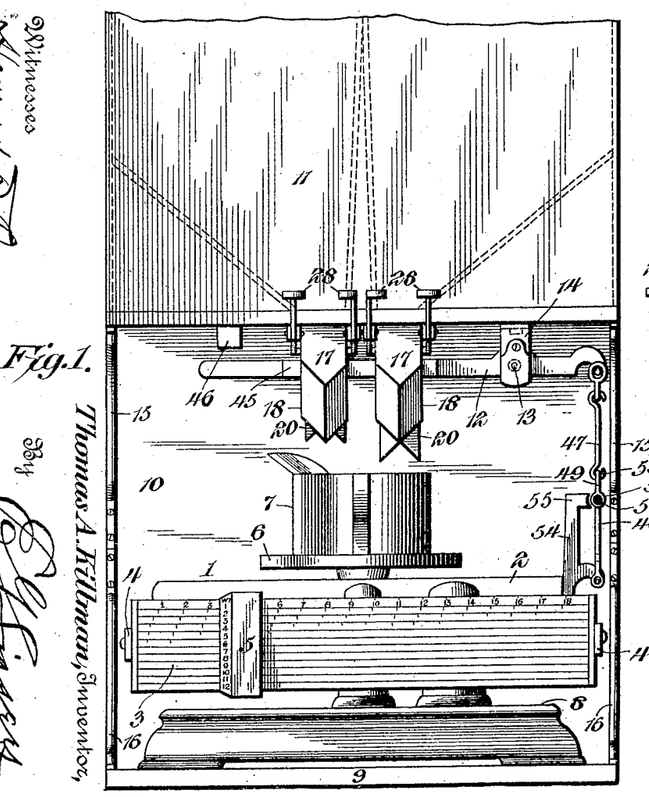
Figure 1 is a side elevation of an automatic weighing and computing scale constructed in accordance with this invention.
Figure 2:
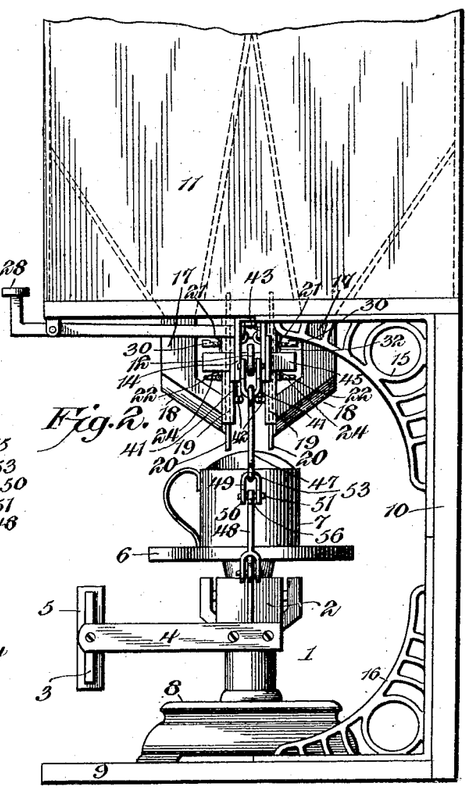
Fig. 2 is an end elevation of the same.
Figure 3:
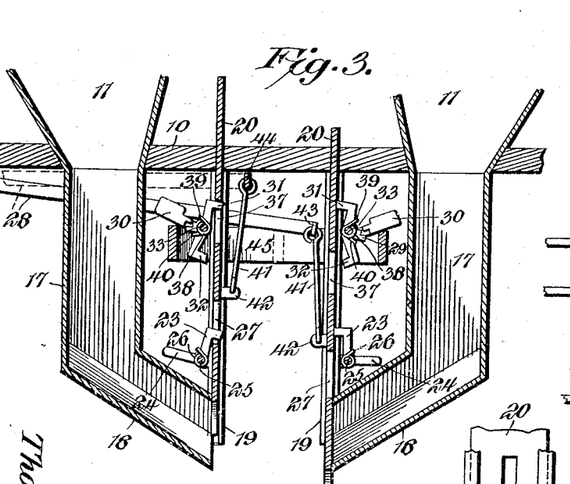
Fig. 3 is an enlarged vertical sectional view of the upper portion of the scale, illustrating the construction and arrangement of the mechanism for controlling the discharge of the material.
Figure 6:
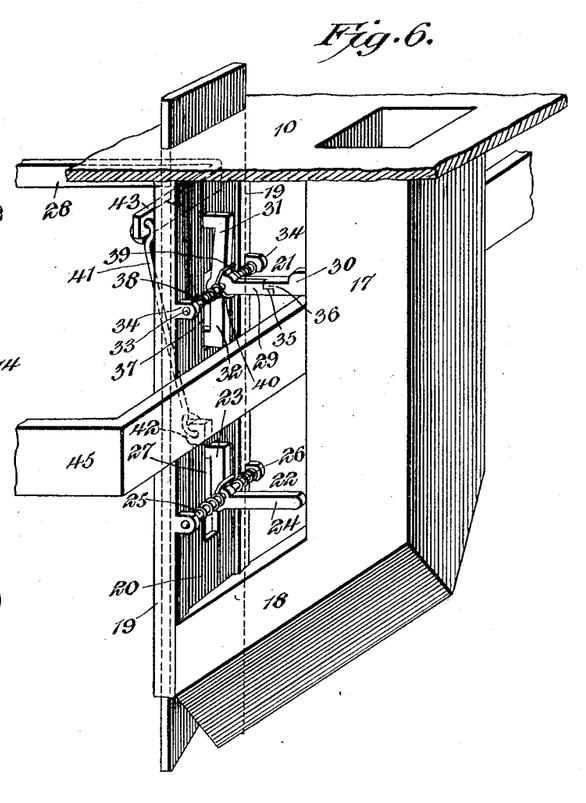
Fig. 6 is an enlarged detail perspective view of one of the spouts and its supply-gate or cut-off, showing the latter in its intermediate position.
Figure 7:
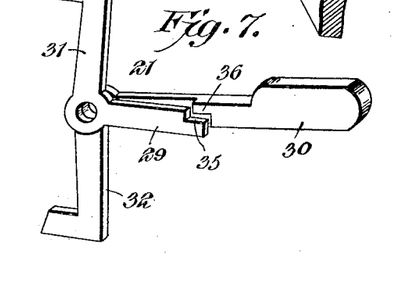
Fig. 7 is a detail perspective view of the upper latch.
Figure 8:
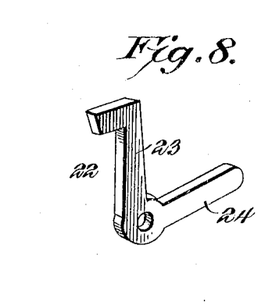
Fig. 8 is a similar view of the lower latch.
Figure 9:
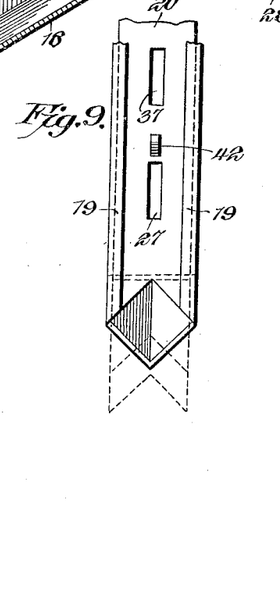
Fig. 9 is a detail view of one of the spouts and its supply-gate or cut-off.
Figure 10:
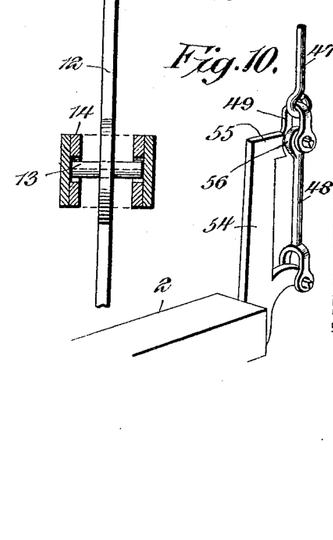
Fig. 10 is an enlarged detail perspective view illustrating a portion of the connection between the upper and lower beams.
Figure 11:
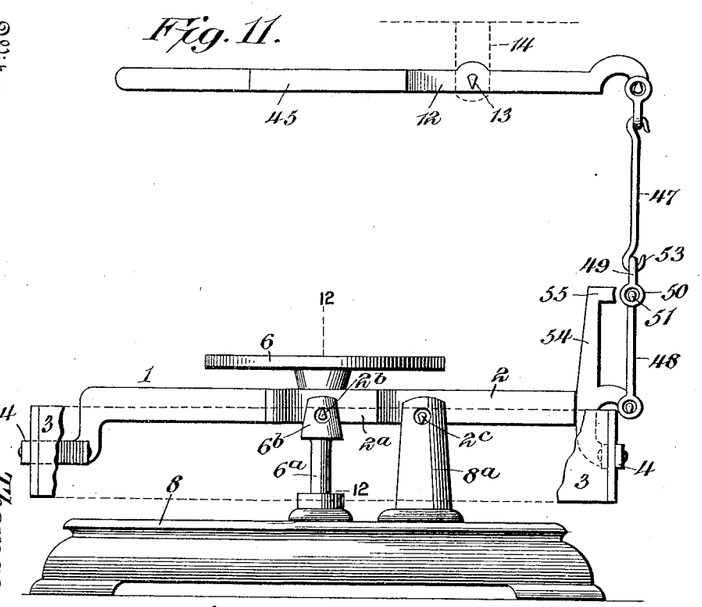
Fig. 11 is an elevation, partly in section, illustrating the manner of mounting the lower beam and the connection of the same with the scale-pan.

The hopper or bin may be provided with one or more compartments, and in the accompanying drawings it is shown provided with four separate compartments arranged in pairs at the front and back and provided with depending spouts 17, having inclined lower portions 18. The lower portions of the compartments of the hopper or bin taper toward the spout, as indicated in Figs. 1, 2, and 3, and the spouts are arranged in pairs at the front and back of the upper beam 12. The lower inclined portion of each spout is provided with lower oppositely-inclined side walls. The upper portions of the side walls are arranged in vertical planes and are parallel and are connected by the top wall of the spout. The lower or discharge end of the spout is provided with vertical edges, from the opposite sides of which extend vertical ways 19, forming a guide for a supply-gate or cut-off 20. The ways, which are substantially U-shaped in horizontal section, extend from the lower end of the spout to the top of the frame, and the upper ends of the supply-gates or cut-offs pierce the top of the frame at points between the lower tapered portions of the front and rear compartments. The lower end of each supply-gate or cut-off is provided with a substantially V-shaped or triangular notch which when the supply-gate or cut-off is entirely open, as shown in Fig. 9 of the drawings, coöperates with the lower inclined side portions of the spout to form a substantially rectangular discharge-opening. The material is permitted to discharge in a large stream when the parts are arranged as illustrated in full lines in Fig. 9 of the drawings, and after the bulk of the charge has been delivered to the scale the sliding supply-gate or cut-off is dropped to the intermediate position illustrated by the upper dotted lines in Fig. 9 of the drawings. This reduces the size of the stream without altering the form of the discharge-opening, and there is no liability of the grains of material catching in the corners of the spout and interfering with the closing of the cut-off when the supply-gate or cut-off is dropped to the lower position illustrated by the lower dotted lines in Fig. 9. Each supply-gate or cut-off is engaged by upper and lower latches 21 and 22. Each lower latch, which is substantially L-shaped, is composed of two arms 23 and 24, arranged vertically and horizontally when the cut-off is closed, as indicated at the right-hand side of Fig. 3 of the drawings. This latch 22 is pivoted at its angle, and a horizontal pin 25 is mounted on suitable ears or flanges extending from the ways 19. The upwardly-extending arm is provided with a projection or tooth and is engaged by a spring 26, which is adapted to throw the arm 23 toward the supply-gate or cut-off. The spring is composed of a central loop and opposite coils, the coils being mounted on the pivot or pin 25 and the loop being engaged with the back of the arm, as clearly shown in Figs. 3 and 6 of the drawings. The lower portion of the supply-gate or cut-off is provided with a slot 27, into which the arm 23 of the lower latch extends when the supply-gate or cut-off is manually raised by depressing a key 28. When the engaging portion of the lower latch extends into the slot or opening 27, it is adapted to support the supply-gate or cut-off in its intermediate position, as illustrated in full lines in Fig. 6 and by the upper dotted lines in Fig. 9 of the drawings. The upper latch is composed of two substantially L-shaped members having approximately horizontal arms 29 and 30 and upwardly and downwardly extending arms 31 and 32. The upwardly-extending arm 31 is formed integral with the horizontal arm 29, and the depending arm 32 is formed integral with the arm 30, which is extended beyond the arm 29. Both of the L-shaped members are provided at their angles with alined openings for the passage of a horizontal pin or pivot 33, which is supported by suitable flanges or ears 34, projecting from the upper portions of the opposite guides 19. The horizontal arm 29 is provided at its end with an upper notch 35, and the arm 30 is provided with a shoulder 36, arranged above the bottom of the notch 35 and adapted to engage the same when the arm 30, which is weighted, is free to swing downward. This downward movement of the weighted arm is adapted to throw the depending arm 32 forward or inward toward the supply-gate or cut-off, and at the same time it carries the upwardly-extending arm 31 backward or outward away from the said gate or cut-off. The gate or cut-off is provided with an upper slot or opening 37, and when in its lower position, as illustrated in full lines in Fig. 6 of the drawings, the depending arm extends into the slot 37 and is adapted to be engaged by the lower end wall of the upper slot to limit the opening movement of the supply-gate or cut-off. When the sliding poise of the scale is moved to the right, the right-hand ends of the upper and lower beams swing downward and the left-hand arm of the upper beam swings upward. This movement of the upper beam carries the left-hand arm thereof against the lower edge of each of the arms 30 of the upper latches, and when the upward pressure of the upper beam 12 is less than one-half a pound or other predetermined weight and is insufficient to lift the arms 30 of the upper latches the depending arms 31 will remain in the upper slots of the supply-gates or cut-offs and will prevent the same from being raised to their upper position. By this construction only a small stream of material will discharge into the scale when weighing a half-pound or less, and through this operation small quantities may be accurately weighed.

The upper horizontal pivot or pin 33 supports a spring 38, having opposite spring-coils and upper and lower loops 39 and 40. The spring-coils are arranged on the pin or pivot, and the upper and lower loops engage the outer or rear edges of the upper and lower arms 31 and 32. When the weighted arm 30 is free to swing downward, it holds the upwardly-extending arm 31 out of engagement with the gate or cut-off. When the weighted arm is swung upward by the upper beam 12, the depending arm 32, which is integral with the arm 30, swings the lower loop outward or rearward, placing the spring under tension and causing the upper loop of the spring to exert a pressure on the arm 31. The sliding supply-gate or cut-off will then be free to move to its upper position, and as soon as the upper slot passes the engaging portion of the arm 31 the latter will be swung forwardly or inwardly into the slot and will support the supply-gate or cut-off in such elevated position, as illustrated in full lines at the left-hand side of Fig. 3 of the drawings. The material is then caused to discharge in a large stream. As soon as the scale has received within one-half a pound of its full charge the upward pressure exerted by the upper beam 12 will be insufficient to overcome the weight of the arms 30 and the latter will swing downward, thereby withdrawing the upwardly-extending arm 31 from the elevated supply-gate or cut-off and the latter will drop by gravity to its intermediate position, the closing movement being limited by the lower latch. This action will reduce the size of the stream, and the last half-pound of the charge will be delivered to the scale in a small stream, which will not affect the accuracy of the weighing operation. When the scale receives its full charge and reaches the poising-point, the upper beam 12 in its downward movement will engage the arm 24 of the lower latch, which will be swung downward, thereby withdrawing the arm 23 from the lower slot and permitting the supply-gate or cut-off to drop by gravity to its lower position. The flow of material will then be entirely cut off. Owing to the scale-beam being in unstable equilibrium at the poising-point, a quick downward movement is secured, and this will be sufficient to effect a rapid cut-off of the flow of material.

Figure 4:
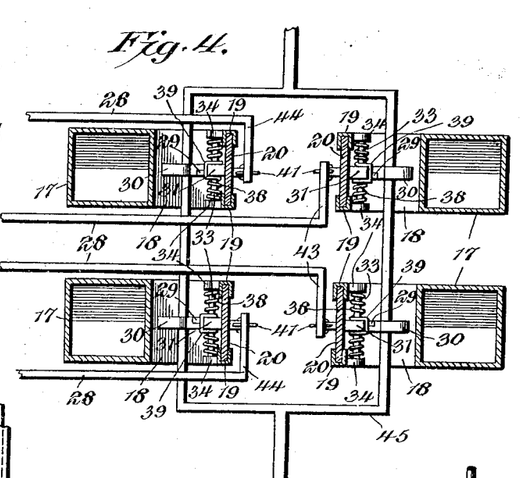
Fig. 4 is a horizontal sectional view of the same.
Figure 5:
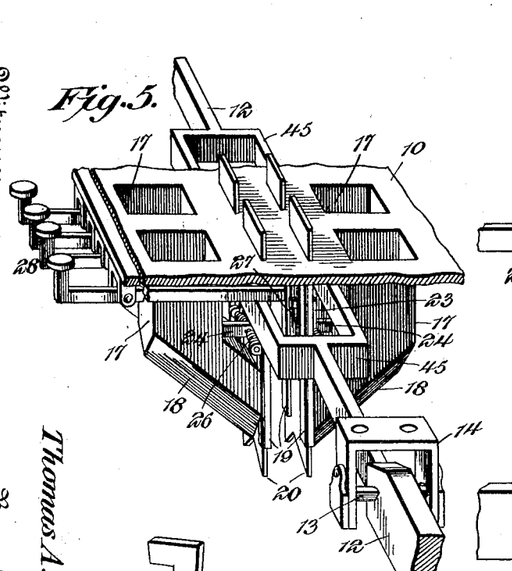
Fig. 5 is an enlarged detail perspective view of the mechanism for controlling the discharge of the material.

The keys, which consist of levers, are mounted between their ends in suitable hangers of the frame and are provided at their front ends with upwardly-extending arms carrying heads, which may be provided with any suitable characters for designating the goods contained within the several compartments of the bin or hopper. The inner ends of the keys are connected by links 41 with the supply-gates or cut-offs, which are provided with projecting ears 42, having perforations to receive the links. The links 41 are preferably provided at their ends with eyes or rings for engaging the levers and the ears 42. The keys may be arranged in any desired manner, as will be readily understood, a simple arrangement being illustrated in Fig. 4 of the drawings, wherein the two inner or intermediate keys are connected with the rear gates or cut-offs and are provided with outwardly-extending arms 43. The outer or end keys, which are connected with the front gates or cut-offs, are provided with inwardly-extending arms 44. The ends of the keys may be bent in any other desired manner to arrange them out of the way of the upper beam 12 and to enable them to be conveniently connected with the supply-gates or cut-offs.

The upper beam 12 is provided adjacent to the cut-offs with a rectangular portion 45, having opposite spaced parallel actuating members or portions for operating the upper and lower latches. When the upward pressure of the left-hand arm of the beam 12 is sufficient to overcome the pressure of the weighted arms 30, the upper beam 12 will move upward until it engages a stop 46 and will remain in such position until the bulk of the charge is delivered into the scale. As soon as this takes place and the pressure of the upper beam 12 is insufficient to overcome the pressure of the weighted arms 30 the left-hand arm of the upper beam 12 will begin to move downward and will approach the poising-point. The upper and lower beams, as before explained, are in unstable equilibrium when in a horizontal position or at the poising-point, and in order to prevent any jar or vibration from affecting the operation of the scale when the upper beam 12 is in contact with the stop 46 and also to prevent any jar from affecting the downward movement of the upper beam from the said stop 46 the scale is provided with means for steadying the upper and lower beams and rendering the same stable at the right-hand side of the poising-point, so that during the weighing operation the movement of the upper and lower beams toward the poising-point will be slow and entirely controlled by the material. This result is obtained by the particular construction of the means for connecting the right-hand ends of the upper and lower beams, which, however, are freed from the steadying effect of the said connection just before they reach the poising-point, so that the condition of unstable equilibrium will prevail when the scales are in a horizontal position or at the poising-point to throw the left-hand arm of the beam 12 downward quickly to effect the closing of the supply-gate or cut-off after a charge of material has been delivered to the scale. The connection between the right-hand ends of the beams consists of upper and lower rods or bars 47 and 48 and an intermediate link 49, which is inverted-U-shaped and which is provided at the lower ends of its sides with bearings 50 to receive an intermediate knife-edge pivot 51 of the lower bar or rod 48. The upper rod is provided at its lower end with a hook 53 for engaging the link 49. The lower beam is provided at its right-hand end with an upwardly-extending arm 54, having a projecting portion 55 at its upper end for engaging the upper end of the lower bar or rod 48 when the lower ends of the beams swing downward. This changes the effective pivotal point from the lower end of the rod or bar 48 to the upper end thereof, and the beams at this side of the poising-point are steadied until the upward movement carries the arm 54 away from the upper end of the link or bar 48. This operation takes place as the scale reaches the poising-point, and a quick downward movement of the left-hand arm of the upper beam 12 is effected, as before explained. The upper end of the rod or bar 48 is enlarged and rounded to form a head 56, and the projecting portion 55 of the arm 54 has a concaved edge to fit against the head or enlargement 56. Other means may be provided, and the arm 54 may be arranged in various ways for shifting the pivotal connection between the beam from one end of the connecting means to the intermediate pivot to render the scale stable at one side of the poising-point.

Having thus fully described my invention, what I claim as new, and desire to secure by Letters Patent, is—

1. A scale of the class described embodying upper and lower beams in unstable equilibrium, a connection between the beams, and means for steadying the beams during a portion of their movement.

2. A scale of the class described embodying upper and lower beams in unstable equilibrium, a connection between the beams, and means carried by one of the beams for engaging the connection for steadying the beams during a portion of their movement.

3. A scale of the class described embodying upper and lower beams, a connection between the beams, and means carried by the lower beam for engaging the connection to steady the beams during a portion of their movement.

4. A scale of the class described, embodying spaced beams arranged in unstable equilibrium, a connection between the beams pivotally connected with the same, said connection having an intermediate pivot, and an arm carried by one of the beams and arranged to engage the connection at the intermediate pivot during a portion of the movement of the beams.

5. A scale of the class described embodying upper and lower beams, a connection between the beams, and means carried by one of the beams for engaging the said connection, the latter being also provided at such point of engagement with a joint.

6. In a scale of the class described, the combination of a beam, a vertically-movable supply-gate adapted to close by gravity, and a latch for holding the gate in its open position, said latch being arranged beneath and in the path of the beam and adapted to be disengaged from the gate by the said beam.

7. In a scale of the class described, the combination of a beam, a supply-gate, a depressible key connected with the supply-gate for opening the same, and means for holding the gate in an open position, said means being arranged in the path of the beam.

8. In a scale of the class described, the combination of a beam, a supply-gate, means arranged in the path of the beam and operated by the same for holding the gate entirely open while the scale is receiving the bulk of the charge and for permitting a partial closing of the supply-gate after the scale has received the bulk of the charge, and means for checking the supply-gate in its partially-closed position.

9. In a scale of the class described, the combination of a beam, a supply-gate, and a latch having yieldable means for limiting the opening movement of the gate, said latch being arranged in the path of the beam and adapted to prevent the gate from being entirely opened, when the pressure exerted by the beam is insufficient to overcome the pressure of the latch.

10. In a scale of the class described, the combination of a beam, a supply-gate, and a latch having means for limiting the opening movement of the gate and provided also with supporting means for holding the gate open, said latch being also provided with a movable member arranged in the path of the beam and adapted to be operated by the same when the pressure on the beam is sufficient to overcome the weight of the movable member.

11. In a scale of the class described, the combination of a beam, a supply-gate, a latch having arms arranged respectively to limit the opening movement of the gate, and to support the same in its opened position, said latch being also provided with a weighted arm coöperating with the said arms and adapted to operate the same when the pressure of the beam is sufficient to raise the weighted arm.

12. In a scale of the class described, the combination of a beam, a supply-gate, a latch composed of movable members having engaging portions for limiting the opening movement of the gate and for supporting the same in its opened position, said members being provided with arms arranged adjacent to each other, one of the arms being weighted and provided with means for engaging the other, said weighted arm being arranged in the path of the beam, and means controlled by the member having the weighted arm for engaging the other member with the gate when the pressure of the beam is sufficient to raise the weighted arm.

13. In a scale of the class described, the combination of a beam, a supply-gate, a latch composed of two movable members having engaging portions and provided with arms, one of the arms being weighted and having means for engaging the other, and a normally inactive spring arranged to be placed under tension by the member having the weighted arm for engaging the other member with the gate.

14. In a scale of the class described, the combination of a beam, a supply-gate, a lower latch arranged in the path of the beam and arranged to support the gate in a partially-opened position, and an upper latch having means for yieldably limiting the opening movement of the gate and provided also with means for supporting the gate in its opened position, said upper latch being operable by the beam when the pressure thereof is in excess of the pressure exerted by the said upper latch.

15. In a scale of the class described, the combination of a beam, a spout, a guide, a sliding cut-off arranged in the guide and provided with upper and lower slots, and upper and lower latches arranged above and below the beam in the path of the same.

16. In a scale of the class described, the combination of a beam, a spout, opposite guides, a slide mounted in the guides, latches located above and below the beam for supporting the gate in an opened position and operated by the beam for successively releasing the gate, and means for manually opening the gate.

17. In a scale of the class described, the combination of a beam, a vertically-movable gate, a lower latch arranged in the path of the beam for supporting the gate in a partially-opened position, and an upper latch for supporting the gate open, said latches being arranged to be successively operated by the beam for reducing the size of and cutting off the stream.

18. In a scale of the class described, the combination of a spout having oppositely-inclined bottom portions extending downward from the sides of the spout to the median line of the bottom thereof, a supply-gate located at the discharge end of the spout and having a substantially V-shaped notch coöperating with the oppositely-inclined portions of the spout to form a substantially rectangular discharge-opening, and means for operating the gate.

19. In a scale of the class described, the combination of a plurality of compartments having discharge-spouts, supply-gates arranged at the discharge ends of the spouts, a beam having spaced actuating members arranged adjacent to the gates, and latch mechanism located in the path of the beam for holding the gates open and adapted to be tripped by the beam.

20. In a scale of the class described, the combination of a plurality of compartments having discharge-spouts, supply-gates arranged at the discharge ends of the spouts, a beam having spaced actuating members arranged adjacent to the gates, latch mechanism located in the path of the beam for holding the gates open and adapted to be tripped by the beam, and keys connected with the gates for opening the same.

21. In a scale of the class described, the combination of upper and lower beams arranged in unstable equilibrium, a connection between the beams pivoted to the same, means for steadying the beams during a portion of their movement, a stop arranged to be engaged by the upper beam for limiting the upward movement thereof, a spout, a supply-gate, and means located in the path of the beam for holding the gate open, said means being arranged to be tripped by the beam for closing the spout.

22. In a scale of the class described, the combination of a frame, a hopper mounted on the frame and having front and rear compartments provided with spouts, said spouts being spaced apart and having inclined portions, guides extending upward from the spouts, supply-gates arranged in the guides, latches for holding the gate in an opened position, a beam having an open portion, the sides of which are arranged to operate the latches, and means for opening the gates.

23. A scale of the class described embodying parallel beams, a connection between the beams having an intermediate joint, and means carried by one of the beams for engaging the connection at the intermediate joint for steadying the beams during a portion of their movement.

24. A scale of the class described embodying parallel beams, a connection between the beams pivotally connected to the same, said connection being provided with an intermediate joint, and means carried by one of the beams for engaging the connection to steady the beams during a portion of their movement, said means when in engagement with the connection also serving to shift the effective pivotal point from one end of the same to the intermediate joint.

25. A scale of the class described embodying spaced beams, a connection between the beams, and an arm carried by one of the beams and arranged to engage the connection during a portion of the movement of the beams to steady the latter.

26. The combination of a scale, a vertically-slidable supply-gate, a plurality of devices located at different points for supporting the gate in different positions to vary the size of the stream of material, and means for successively tripping the said devices.

27. The combination of a scale, a gate or cut-off, upper and lower devices for supporting the gate or cut-off in an open position, and means for automatically tripping the upper device to effect a partial closing of the cut-off before the scale has received its full charge.

28. In a scale of the class described, the combination of a beam, a vertically-movable gate or cut-off, and upper and lower devices for holding the gate or cut-off in an open position, said devices being arranged to be successively tripped by the beam.

29. In a scale of the class described, the combination of a beam, a supply-gate, and a weighted device having means for limiting the opening movement of the gate, said device being arranged in the path of the beam and adapted to prevent the gate from being entirely opened when the pressure exerted by the beam is less than that of the weight of the device.

30. The combination with a scale, of a supply-gate, latch mechanism for limiting the opening movement of the gate and provided with means for retaining the gate in its open position, and means for automatically operating the latch mechanism to permit the gate to open and also for permitting a closing movement.

31. The combination with a scale, of a cut-off manually-operated means for opening the cut-off, and means automatically operable by the scale for controlling the opening movement of the cut-off.

32. The combination with a scale, of a cut-off, manually-operated means for opening the cut-off, and a gravity device automatically operable by the scale for limiting the opening movement of the cut-off when the amount to be weighed is less than a predetermined weight.

33. In a scale of the class described, the combination of a beam, a vertically-movable gate, manually-operated means for opening the gate, and upper and lower devices for supporting the gate in its open position, the lower device being operable by the said gate-opening means, and the upper device being automatically controlled by the beam for limiting the opening movement of the gate when the amount to be weighed is less than a predetermined weight.

34. In a scale of the class described, the combination of a beam, a vertically-movable gate, manually-operated means for opening the gate, and upper and lower devices for supporting the gate in its open position, the lower device being operable by the said gate-opening means, and the upper device being automatically controlled by the beam for limiting the opening movement of the gate when the amount to be weighed is less than a predetermined weight, said devices being arranged in the path of the beam and adapted to be tripped by the same.

35. In a scale of the class described, the combination of a beam, a vertically-movable gate, manually-operated means for opening the gate, and upper and lower devices for supporting the gate in its open position, the lower device being operable by the said gate-opening means, and the upper device being automatically controlled by the beam for limiting the opening movement of the gate when the amount to be weighed is less than a predetermined weight, said devices being arranged in the path of the beam and adapted to be successively tripped by the same, whereby the size of the stream will be automatically reduced.

36. The combination with a scale, of a cut-off, manually-operable means for opening the cut-off, a plurality of catches for supporting the cut-off in different positions, and a gravity device automatically operated by the scale for controlling the opening movement of the cut-off.

In testimony that I claim the foregoing as my own I have hereto affixed my signature in the presence of two witnesses.

THOMAS A. KILLMAN.

Witnesses:
J. E. GAINES,
W. H. JUSTICE.